United States Patent [19]

Jones

[11] 4,088,791

[45] May 9, 1978

[54] FREE FLOWING MODIFIED WHEY POWDER

[75] Inventor: Robert E. Jones, Oakland, Calif.

[73] Assignee: Marvin F. Beach, Redondo Beach, Calif.

[21] Appl. No.: 662,464

[22] Filed: Mar. 1, 1976

[51] Int. Cl.$^2$ .............................................. A23C 21/00
[52] U.S. Cl. ..................................... 426/99; 426/250; 426/540; 426/583
[58] Field of Search ................ 426/41, 580, 583, 588, 426/250, 330.2, 334, 96, 97, 99

[56] References Cited

U.S. PATENT DOCUMENTS

| | | | |
|---|---|---|---|
| 3,560,220 | 2/1971 | Bangert et al. | 426/583 X |
| 3,579,356 | 5/1971 | Miller et al. | 426/540 |

Primary Examiner—Joseph M. Golian
Assistant Examiner—Robert J. Warden
Attorney, Agent, or Firm—J. H. Slough

[57] ABSTRACT

Preparation of a free flowing modified whey powder, and anti-caking, anti-sticking additive keeping the powder free flowing during preparation, the additive including a mixture of fat and titanium dioxide, and suitable for preparing said powders from sweet, acid wheys, or a mixture of the same.

26 Claims, No Drawings

FREE FLOWING MODIFIED WHEY POWDER

This invention relates to a free flowing modified whey powder and to a process for its preparation which employs an anti-caking, anti-sticking additive to keep the powder free flowing.

Whey, a by-product of the manufacture of cheese, has been a continuing problem for the cheese industry. It represents a very large portion of the raw milk used in cheese making; approximately 90% of the milk is converted into whey. The volume of this effluent stream, and its high BOD level, poses serious disposal problems in complying with the guidelines and regulations of the Clean Water Act. Small cheese makers can treat whey as sewerage, or pay to have it removed. Larger plants can process whey to recover the solids by evaporation and develop markets for whey to offset the processing costs.

Over the past 70 years, various processes have been developed for recovering whey solids. The first dried whey solids were sticky, resulting in problems with whey solids adhering to the walls of the processing equipment eventually causing shutdown of the equipment, and with the solidification of the powdered whey solids after short periods of storage. This stickiness was attributed to lactose, which is the principal constituent of whey, and about 35 years ago various processes were developed to promote crystallization of lactose prior to the drying of whey solids.

Crystallization before drying is used today to provide for a non-sticky, free flowing, powder from whey and many pieces of equipment have been developed to serve the various steps in this drying procedure. This technique is effective in the drying of sweet whey, which is the whey resulting from the manufacture of the so-called hard cheeses, such as cheddar, swiss, brick, mozzarella, et cetera. The dried powder can have virtually all of the lactose in crystalline form and it will remain free flowing even after long periods of storage.

Without crystallization, sweet whey becomes sticky during drying, adhering to the inner walls of the drying vessels, and resulting in a powder which quickly cakes, or hardens, due to the hygroscopic nature of uncrystallized lactose. If crystallization of lactose is insufficient prior to drying, the product will still be sticky, and will also cake after storage although to a lesser extent. To insure a non-sticky, non-caking product, one must attain high levels of crystallization prior to drying. This is done by two-stage crystallization, obtaining the bulk of crystals prior to spray drying, then spray drying to a moisture level sufficient to permit crystal formation from the lactose which had been dissolved in the water removed by the spray dryer. This is usually around 15% moisture, which moisture level is usually held for 5 to 15 minutes to allow time for the crystals to form. Then the powder is final dried to about 3.5%.

However, not all cheese whey can be converted into a free flowing powder by the present art. Whey from the manufacture of soft cheese, such as cottage cheese, known in the industry as acid whey, is difficult to crystallize and even when crystallized, is difficult to dry into a non-sticky, free-flowing powder.

So troublesome is the drying of acid whey that most producers of cottage cheese do not even attempt to dry their whey. It is simply disposed of in a waste water treatment system or hauled away, sometimes concentrating it to reduce its volume before hauling.

The modified whey powder of the present invention is superior to traditionally dried whey and is suitable as a direct replacement for non-fat dry milk solids. It contains titanium dioxide which imparts a white color and it contains a higher level of fat than ordinary whey.

Ordinary whey is classified according to its lactic acid content into the categories of acid whey having a titratable acidity not less than 0.30% and sweet whey having a titratable acidity not greater than 0.16%. A new category of medium acid whey is being proposed having a titratable acidity of 0.16% to 0.4%. Acid whey has different properties than sweet whey and generally finds different markets. In most applications they cannot be interchanged.

The present invention, by using neutralization, standardizes the acidity, and by using fat and titanium dioxide, adjusts the functional properties of the whey so that acid whey and sweet whey, and mixtures of the two can be processed into the same product. There is a variation of ash level due to neutralization, but not enough to exceed the permissible ash range in the product.

The product of the present invention has a typical analysis of 65% lactose, 12% protein, 15% ash, 2.5% fat, 1% titanium dioxide, 2.5% moisture, with the balance being nitrogen-free extract. Ordinary whey has 10% ash, 0.5% fat and no titanium dioxide.

The product of the present invention can be used as a replacer for non-fat dry milk solids in such products as doughnut mixes, cake mixes, bread mixes, pancake mixes, sweet roll mixes, cream sauce mixes, gravy mixes, ice cream and ice milk mixes, frozen custard mixes, and the like. It can replace 80 to 100% of the non-fat dry milk in such mixes. Because of its superior functional properties, it is at present worth approximately twice the value of ordinary dried whey.

Numerous approaches have been used to dry whey. These processes generally involve crystallization, some involve neutralization and a few involve the use of additives to alter the drying characteristics of whey. The present invention involves the use of an anti-caking, anti-sticking additive consisting of titanium dioxide, fat and water, added to the whey prior to drying in a unique and novel approach as compared to the prior art processes. What follows is a brief discussion of what is believed to be some of the more relevant prior art in this regard.

U.S. Pat. Nos. 1,928,135; 2,088,606; 2,126,807 and 3,615,663 are illustrative of certain prior art involving the processing of whey and illustrate the dependence upon crystallization, a necessary condition for producing a free flowing whey powder.

It is a general disadvantage of the prior art mentioned above that, because of the special difficulties with drying acid whey, the crystallization techniques have only been partially successful with acid whey and the results are inconsistent. Because of that, very little acid whey is spray dried today.

Numerous approaches have been used to mix additives with whey and certain of these additives have been used in the processing of sweet whey. It has been proposed to produce a free flowing powdered milk, for example, by adding tricalcium phosphate with dry powdered milk, the tricalcium phosphate serving an an anti-caking agent. See U.S. Pat. No. 1,966,513 to Moss et al. The tricalcium phosphate is added as a dry mix in such process. U.S. Pat. No. 2,232,248 to Lavett describes the addition of the use of sodium bisulphite on a dry basis to whey to neutralize the same. U.S. Pat. No. 2,995,447 to Cipolla et al. describes a method of adding calcium silicate to pulverize dry whey after spray drying of the same.

Certain other patents have been granted which describe the use of titanium dioxide as a coloring agent to whiten food products, including imitation milk, cheese and other dairy products. For example, note U.S. Pat. Nos. 3,579,356 to Miller et al.; 3,615,674 to Bass et al.; and 3,897,572 to Riggs et al.

Vegetable fat and a dry vegetable protein have been used in preparing simulated dairy milk, beverage-type foods prepared from sweet dairy whey.

It is an object of the present invention to provide a free flowing powder from acid whey or sweet whey or any mixture of said wheys and an additive mixture of fat, titanium dioxide and water, which powder need not contain any crystallized lactose, yet will not adhere to the inner walls of vessels during drying, and will remain free flowing after prolonged storage.

It is another object of this invention to provide a process for preparing such a free flowing powder from whey in which the following steps are accomplished:
1. Concentration of the whey
2. Neutralization of the whey
3. Intimate mixture of the whey with titanium dioxide and fat while in a watery mixture
4. Drying of the whey.

It is another object of this invention to provide a process which permits the adjustment and standardization of end product properties prior to drying.

It is another object of this invention to provide a process which permits the admixture of sweet and acid whey in any ratios, prior to drying.

It is another object of certain embodiments of this invention to provide a process which permits the level of lactose crystallization to be used as a control in adjusting the properties of the dried whey for specific applications.

These and other objects of this invention will be apparent to one skilled in the art from a consideration of this entire disclosure.

This invention relates to a free flowing, non-caking powder, comprising acid or sweet whey, or mixtures thereof, in any ratio, with or without crystallized lactose, and an anti-caking, anti-sticking additive. Such powder is prepared in accordance with the process of this invention by:

1. Concentrating the whey to at least 20% solids and preferably in the range of 40–50%, not over 70%.
2. Neutralizing the whey to a pH of at least 5.6 and preferably in the range of 6.7 to 7.0 and not over 8.0. In the case of sweet whey, or mixtures of acid and sweet whey, when the pH is not less than 5.6, it is not necessary to neutralize. Neutralization can take place before, during, or after concentration.
3. Intimate mixing of the anti-caking, anti-sticking additive into the whey. The additive will be a concentrated mixture of titanium dioxide, fat, and water which, when mixed with the whey, will form a more dilute mixture. The anti-caking, anti-sticking additive consists of titanium dioxide, a fat, and water, in the preferred weight ratio of 40% fat, 40% water, 20% titanium dioxide; however, ratios can range from 40% fat, 50% water, 10% titanium dioxide, to 20% fat, 60% water, 20% titanium dioxide. The anti-caking, anti-sticking additive is intimately mixed, preferably as an emulsion, by means of a high degree of agitation at a temperature of 130° to 200° F. The level of anti-caking, anti-sticking additive to be added to the whey can be varied to adjust the degree of stickiness and flowability, but for practical reasons, is held to levels dictated by the end use of the final product. If the product is to be used as a human food, the titanium dioxide level must be below 1% to meet Food and Drug Administration criterion. If it is to be used as an ingredient in human foods where it is the sole source of titanium dioxide, and it comprises 50% of the formulation, the titanium dioxide level can be 2%. It has been found that a minimum of 0.05% titanium dioxide and 1% fat, as measured on a final dried product basis, is needed to assure a non-sticky, non-caking, free flowing product, and that 1% titanium dioxide and 2.5% fat, as measured on a final dried product basis, are the preferred titanium dioxide and fat levels. Higher levels of titanium dioxide up to 20% would not impair the product if it were not used for human food. Higher levels of fat up to 70% could be employed with satisfactory results. However, for the practical reason of complying with present FDA criteria, the product would be classified as inedible at higher levels.

4. Spray drying under conditions of fine atomization.

Equipment

The preferred type of equipment for drying the modified whey product of this invention is a nozzle-type spray dryer. This type of dryer creates a fine atomized mist of the whey by means of a bank of spray nozzles operated under high pressure and mixes the mist with hot dry air within a cyclonic drying chamber. The bulk of the particles drop out the bottom of the dryer and the air stream is cleansed by means of additional cyclones to afford maximum recovery of particles.

The pretreatment of the whey for neutralization and concentration can be easily accomplished in standard dairy processing equipment systems.

Whey

Any kind of whey obtained from the processing of milk can be used in this invention. This includes whey from the manufacture of sweet cheese, such as cheddar, swiss, romana, colby, brick, mozzarella, et cetera, and acid cheeses such as cottage, cream, bakers, et cetera, as well as whey obtained from the churning of butter and whey obtained from the production of casein from milk.

Whey has a typical composition of 5.8 to 6.5% solids in a watery solution and the solids have a typical composition of 0.5 to 2% fat, 0.7 to 10% ash, 1 to 17% protein, 65 to 88% lactose and 0.1 to 12% lactic acid. The ratio of lactose to lactic acid, which is a breakdown product of lactose, determines whether the whey is classified as acid whey or sweet whey, and this ratio is influenced by the type of cheese being made.

The lactose in fresh whey is in a non-crystalline form. If the whey solids were to be obtained without the prior crystallization of the lactose, the lactose would be in an unstable condition and would readily absorb water from its environs to transform into the more stable crystalline form. One molecule of lactose would absorb five molecules of water to undergo the change to crystallinity. Uncrystallized lactose is, therefore, hygroscopic and, as the crystals are formed, the particles tend to bind together. Because of the abundance of lactose in whey, whey is very much influenced by the behavior of the lactose. Whey containing uncrystallized lactose is hygroscopic and will stick to the inner walls of the drying vessels during processing, cake during storage, and clump into nodules, rather than freely disperse when mixed with water. Whey containing partially-crystallized lactose will exhibit these properties to a proportionate degree.

The state of the art method for drying whey solids employs crystallization as an integral step. A minimum amount of crystallization is required to prevent sticking to the vessel walls. Crystallization is accomplished by concentrating the whey to about 50% solids and cooling it rapidly to about 85° F., which results in a supersaturated solution of lactose. Small crystals then form spontaneously, although sometimes the solution is "seeded" with crystals of lactose, and then the solution is gradually cooled to about 40° F. This causes the solution to become supersaturated because the solubility of lactose decreases with a decrease in temperature, and the excess lactose then forms crystals and leaves the solution. All procedures for spray drying whey employ this step. The degree of crystallization is influenced by the level of concentration, the rate of cooling, the final temperature and how long the solution is held at the final temperature. There is always some uncrystallized lactose remaining after this step because the water will retain enough dissolved lactose to remain saturated. This dissolved lactose is crystallized during spray drying by lowering the moisture level in two steps, the first to about 15% moisture, where the solution of remaining water and dissolved lactose is now supersaturated. The whey solids are held at this moisture level for 5 to 15 minutes to permit the lactose to crystallize out of solution, and then the whey solids are final dried to about 3.5% moisture.

By this procedure, it is possible to crystallize virtually all of the lactose. Some types of whey crystallize very easily, others do not. The class of acid wheys including cottage cheese whey, cream cheese whey, and casein whey do not crystallize easily. The presence of lactic acid and the effect of acidulation upon the other ingredients in whey serve to inhibit crystallization. Some of the prior art employed neutralization of the acid whey prior to crystallization to convert lactic acid to a non-acidic form, but this is not sufficient to permit acid whey to crystallize as easily as sweet whey.

The present invention does not require any crystallization of lactose. It is the admixture of titanium dioxide and fat to the whey that effectively prevents sticking of product to the drying vessels, and caking during storage, and the product remains free flowing regardless of whether the lactose is in a crystalline form.

Some of the uses for the product of the present invention require certain dispersing and dissolving characteristics which are a function of the degree of crystallization of the lactose. Therefore, the process of the present invention can include provisions for crystallization, but this is only to control the end use properties of my product: crystallization is not necessary to produce a non-caking, free flowing powder.

Neutralization is a necessary step in pretreating acid whey for the present invention. For acid whey, the pH must be raised to at least 6.2, and the optimum range is 6.7 to 7.4. Neutralization of sweet whey or mixtures of sweet and acid whey is necessary only if the pH is lower than 5.6 and it should be raised to at least 6.2 with a preferred range of 6.2 to 7.4.

I have worked with aluminum hydroxide and magnesium hydroxide as well as calcium carbonate, sodium hydroxide, and calcium hydroxide, all of which form a metallic salt with lactic acid. I have found that sodium compounds are undesirable because sodium lactate is a syrupy liquid which also tends to make the product sticky and it imparts an undesirable taste and odor to the products of the present invention. Calcium lactate is a colorless, odorless, solid which has none of those shortcomings.

A mixture of calcium carbonate, aluminum hydroxide, and magnesium carbonate is also effective, but also tends to produce precipitation which can be reduced by replacing the calcium carbonate with calcium hydroxide.

In neutralization, it is desirable to reach the same degree of acidity as non-fat dry milk which the product of the present invention is designed to replace. Additionally, the acidity of the product affects its functional properties in its end uses, such as taste, whip-ability, leavening properties, solubility, water activity, fat binding characteristics. Accordingly, it is desirable to adjust the acidity to pH 7.0. Fresh sweet whey generally does not require neutralization to make acceptable end products. However, wheys having a pH below 5.6 must be neutralized to at least 6.2 and preferably in the range of 6.7 to 7.4 to prevent sticking in the spray dryer as well as to make an acceptable end product.

When preparing the neutralizing agent, the preferred range of concentration is 4 normal solution up to a 25% by weight solution. A more concentrated solution makes for difficulty in dissolving the chemical agents, and a more dilute solution than 4 normal tends to introduce too much water into the whey.

Anti-caking, Anti-sticking Additive

The additive useful in the present invention comprises a mixture of titanium dioxide, fat and water. I have found that U.S. pure titanium dioxide is effective, and that the anti-caking, anti-sticking additive should be introduced ahead of spray drying to prevent sticking of the product to the inner walls of the drying equipment. I have found that I could not merely mix titanium dioxide with whey, the titanium dioxide must first be conditioned so that it will form an intimate mixture with the whey. This is accomplished in the present invention by the formation of a concentrated mixture of the titanium dioxide with fat and water and then introducing the mixture to the neutralized whey where a second, more dilute, mixture is formed.

The preferred method is to mix titanium dioxide, fat and water in the ratios of 40% water, 40% fat and 20% titanium dioxide, recycle the solution through a high shear mixer, such as a high speed centrifugal pump, a colloidal mill, or a milk homogenizer. The solution should be heated to at least the melting point of the oil used, but for practical reasons of complying with dairy standards, I have operated at conditions sufficient to pasteurize the additive. Therefore, I heat the additive to at least 161° F. and hold for at least 15 seconds to insure pasteurization as recommended in the Federal Register, Vol. 40, No. 30, Part 3, Section 58.236.

The mixture of titanium dioxide, fat and water is emulsified by processing through a high shear mixer at a temperature range of 32° F to 200° F for a time period between 16 seconds and 3 hours; then added to the liquid whey in such ratio that the level of titanium dioxide in the final dried product falls between 0.05 and 20%, and the fat level falls between 0.5 to 70%, subjecting such mixture to agitation prior to spray drying.

The action of the high shear pump is to reduce the titanium dioxide to individual particles, preferably approximately of micron size and the fat into droplets, preferably substantially of 1 to 10 microns and intimately dispersing the titanium dioxide into the fat droplets and forming a mixture of the fat droplets in the water present.

It is desirable to add an emulsification agent to the anti-caking, anti-sticking additive, such as any commercial agent suitable to stabilize emulsions of fat and water. The use of an emulsification agent is an optional step. Good results can be obtained without one.

When the anti-caking, anti-sticking additive is added to the whey, the protein content of whey is usually sufficient to act as a natural emulsification agent, however, the use of a separate emulsification agent here is also an optional step. Similarly, an emulsion stabilizing agent can also be used, either alone or in conjunction with an emulsification agent.

The anti-caking, anti-sticking additive is, therefore, a mixture of water and fat and titanium dioxide, which when added to the whey, forms a new mixture wherein the titanium dioxide, the fat and the whey solids, including the lactose, all come into intimate and uniform contact.

In preparing the anti-caking, anti-sticking additive, I have worked with U.S. pure titanium dioxide, with anatase crystals and rutile crystals. Both are satisfactory, but the anatase crystalline form is more effective in promoting flowability and decreasing the stickiness of the product. An added advantage of the anatase form is that it is white and imparts the desired white color to the final product. An added disadvantage of the rutile form is that it is light yellow rather than white and does not impart the desired color to the final product.

Any grade of titanium dioxide is suitable for the present invention as related to the process claims for producing a free flowing powder that does not adhere to the dryer walls, but the product of the invention has been developed for food use. Therefore, for practical reasons, I have avoided chemicals not approved by the Food and Drug Administration for use in food items, and avoided exceeding the recommended levels. For example, food grade titanium dioxide can be used up to 1% by weight of the finished food product. The product of the present invention is an ingredient in foods, reaching levels of approximately 50% of the formulation of the final food product. Therefore, even though I know higher levels of titanium dioxide would still be effective in my anti-caking, anti-sticking additive, I have worked at levels below 2%.

Titanium dioxide also imparts certain desired functional properties. By functional properties is meant certain characteristic physical and/or chemical reactions the product undergoes or brings about when it is exposed to specific sets of conditions. For example, when mixed with leavened bakery flours, it promotes the release of carbon dioxide, thereby having the functional property of a leavening agent. Similarly when mixed with doughnut batters, it retards the absorption of fat during frying. It also prevents the "bleed off" of fat into the powdered sugar coating of the doughnut; and being a dense opaque white pigment, it lightens the color of the product of the present invention.

For the above reasons, I have concentrated my work around U.S. pure titanium dioxide, but for the purpose of drying uncrystallized whey without intending the product for food uses, other grades of titanium dioxide could be used.

I have used fat according to the same guidelines: Selection from those approved for food uses, and at levels consistent with the desired properties of my end products.

I have worked with animal and vegetable fats (triglycerides, solids and liquids), including whey fat, butterfat, white grease, lard, corn oil, soya oil, coconut oil, and hydrogenated coconut oil. I have found whey fat to be the most effective, due to its close similarity to the naturally occuring fat in whey, and corn oil to be the most effective of the vegetable fats. These are all edible grades of fats, because of the preferred uses for the product of the present invention. However, inedible fats of the same class, such as tallow, could be equally effective in preparing product for use as an animal feed.

For good free flowing, non-caking properties in whey powder containing no crystallized lactose, I have found that I need to use sufficient anti-caking, anti-sticking additive to result in a product containing at least 1% fat and 0.5% titanium dioxide. My preferred levels are 2.5% fat, 1% titanium dioxide. Higher levels also produce a free flowing powder.

Accordingly, I mix my anti-caking, anti-sticking additive at ratios of 40% water, 40% fat, 20% titanium dioxide to 50% water, 40% fat, 10% titanium dioxide and to 60% water, 20% fat, 20% titanium dioxide, and blend the additive to the whey to the preferred ratio of 95 parts whey, 5 parts additive.

Specifically 57% water, 23% fat and 20% titanium dioxide are used.

Processing

After the whey has been neutralized and concentrated, the anti-caking, anti-sticking additive is introduced with continuous agitation, so as to obtain a mixture, preferably an emulsion with the whey. Emulsification can occur readily due to the presence of albumin and other naturally occurring emulsification agents in the whey, and/or emulsification can be assisted with commercially prepared emulsification agents, and stabilization agents.

Representative of emulsification agents are mono and diglycerides of fat forming fatty acids, such as mono and diolein, monostearin, dipalmitin; partial esters of carboxylic acids such as citric, lactic and tartaric acids with the mono and diglycerides of fatty acids, such as glyceryl lactopalmitate, and diesters of glycols and fatty acids such as propylene glycol monostearate. The fatty acids used to prepare the above emulsifiers include those derived from beef tallow and castor, coconut, cottonseed, mustard seed, palm, peanut, rapeseed, rice bran, soybean, tall and marine oils.

Representatives of stabilizing agents are gums, which are naturally occurring plant polysaccharides, such as obtained from trees, seeds, seaweed and microbes including gum arabic, acacia, tragacanth, karaya, larch, ghatti, locust, guar, agar, algin, carrageenan, furcellaran and xanthan, plus also pectin, certain proteins such as gelatin, plus certain chemical derivatives of cellulose.

Agitation such as is obtained in standard whey crystallization tanks, and standard agitated whey storage vessels is sufficient.

The blending of anti-caking, anti-sticking additive and whey is controlled so as to obtain the desired levels of titanium dioxide and fat in the final product. This can be done continuously by metering separate streams of whey and the additive into a common stream, but is more easily controlled by mixing batchwise in agitated tanks, the tank being filled first with a known quantity of whey, and then receives the proper quantity of my additive. While one tank is being mixed, a previously mixed tank is supplying the spray dryer.

The mixing of whey and my additive prior to spray drying serves to permit an intimate and uniform distribution of fat and titanium dioxide with the whey solids while they are still in solution. Because of the small particle size of whey solids, and the small size of the droplets of fat containing the titanium dioxide, such intimate contact is readily obtained, and to a much greater degree than might be obtained by dry mixing of the powdered titanium dioxide and the dry powdered whey solids.

The action of the fat and titanium dioxide is to coat the particles of whey solids as soon as they form during drying, and in whatever size they first solidify. I have found that the greater the atomization in a spray dryer, the greater the effectiveness of the anti-caking, anti-sticking additive. Under conditions of a high degree of atomization causing a mist of very small droplets, a lesser amount of my additive can be used than would be needed under conditions of poor atomization.

In a nozzle type spray dryer, I obtain a high degree of atomization by using small nozzles and high pump pressure. In a wheel type spray dryer, I obtain a high degree of atomization by operating at high wheel speeds. I have not worked with roller dryers because these are used, at present, exclusively for animal feed grade whey, but I believe that the anti-caking, anti-sticking additive of the present invention would be an effective anti-caking agent in roller dried whey.

In a spray dryer, the mist of small whey particles are mixed into a stream of hot dry air causing the particles to dry rapidly, usually before they strike the inner walls of the drying chamber. The particles are blown at high speeds through ducts and cyclones to obtain a separation of whey solids from the air used for drying. In the conventional techniques used for drying, if an appreciable amount of lactose is uncrystallized, the particles become sticky and adhere to each other, and also to the inner walls of the drying and separating chambers. Generally, there is a segregation of the droplets containing uncrystallized lactose from those containing crystallized lactose. The former stick to the inner walls and build up thick layers of whey solids which eventually lead to early shut-down of the drying equipment.

The anti-caking, anti-sticking additive of the present invention coats the particles of whey as soon as they are atomized, preventing them from being sticky, even if their lactose content is uncrystallized. This assures that there will be no build-up of a crust of product within the drying equipment during operation.

The following examples are provided to further illustrate this invention:

EXAMPLE 1

A mixture of cottage cheese acid whey and sweet whey containing 6.3% solids was neutralized to pH 7.0 using 4 normal lime solution and concentrated in a multiple effect evaporator to 45% solids. The concentrate was then cooled to 85° F. and crystallized for 6 hours dropping the temperature to 40° F.

The crystallized whey was mixed batchwise with an additive containing 50% water, 40% whey fat and 10% titanium dioxide, in the ratio of 25 pounds per thousand pounds of whey. The additive had been mixed a few days earlier in a Gaulin homogenizer operated at 3000 PSI and 175° F. and was recycled for a period of 10 minutes at the same pressures and temperature. The mixture was stabilized using Donell E 2 at a .25% by weight level.

The treated whey was agitated for 30 minutes, then spray dried in two steps; in a nozzle-type spray dryer using Number 72A nozzles and Number 17 cores and a spraying pressure of 5500 PSI.

The resultant product did not adhere to the drying equipment walls and had a fat level of 2.5% and 0.5% titanium dioxide and was suitable as a replacer for non-fat dry milk in bakery mixes.

EXAMPLE 2

Fresh sweet whey at 6% solids was concentrated to 45% solids in a multiple effect evaporator. The additive had been prepared 2 days earlier at a ratio of 20% titanium dioxide, 40% coconut oil, 40% water, heated to 165° F., and mixed by recirculation through a high speed centrifugal pump for 5 minutes residence time. The mixture was still stable 2 days later when the additive was mixed with the freshly concentrated whey at a temperature of 95° F. in the ratio of 5 parts additive to 200 parts concentrated whey.

The mixture was spray dried in a nozzle-type spray dryer at a spraying pressure of 4500 PSI.

The product was free flowing, non-caking powder suitable as a replacement for non-fat dry milk in ice cream mixes where crystalline lactose would impart an undesirable graininess to the ice cream mix. It had 1% titanium dioxide and 2.6% fat.

EXAMPLE 3

Fresh cottage cheese acid whey at 6% solids was neutralized to pH 7.0 using a 10% by weight solution of lime. The neutralized whey was then heated to 180° F. and immediately concentrated to 50% solids in a multiple effect evaporator.

The anti-caking, anti-sticking additive was prepared by mixing 20 parts titanium dioxide, 40 parts cottonseed oil, and 40 parts water. The mixture was heated to 150° F. and recirculated through a two-stage homogenizer for 10 minutes allowing the temperature to rise to 175° F.

The additive was mixed with the concentrated whey immediately after evaporation in the ratio of 50 pounds additive to 1000 pounds whey. Donell E 2 was added to the whey in the ratio of 2 ounces per 1000 pounds. The mixture had a temperature of 98° F. and was agitated for 20 minutes before drying.

The mixture was dried in a two-stage spray dryer to provide for a small amount of crystallization of lactose during drying. The resultant powder was free flowing, had 1.8% titanium dioxide, 4% fat, and an improved dispersibility over powder with no crystalline lactose.

EXAMPLE 4

Fresh sweet whey at 6.2% solids was mixed with my anti-caking, anti-sticking additive in such a ratio that the agent equaled 5% of the solids in the whey. The additive contained 20% titanium dioxide, 20% fat, 60% water, and 0.25% Donell E 2.

The whey was heated to 165° F. and concentrated to 45% solids in a multiple effect evaporator. The concentrate was neutralized to pH 6.8 using 4 normal lime solution, and was immediately spray dried in a nozzle type dryer using No. 60 nozzles and No. 421 cores. The spraying pressure was 5000 PSI.

The product was a free flowing powder having 1% titanium dioxide, 2.5% fat, and was suitable as a replacement for non-fat dry milk solids.

EXAMPLE 5

Fresh cheddar whey at 6.3% solids was preheated to 170° F. and concentrated to 42% solids in a double effect evaporator, producing a concentrate at 105° F.

Additive consisting of 20% titanium dioxide, 60% whey cream, 20% water was prepared the day before by recirculating through a high speed centrifugal pump for 5 minutes at a temperature range of 165° to 180° F. The whey cream consisted of 56% water, 38% fat, 2% protein and 4% carbohydrate, giving the additive an overall fat level of approximately 23%. The protein level of the whey cream served as a natural emulsifying agent.

The additive was introduced to the concentrated whey along with additional whey cream such that the final dried product would have 40% fat content and 1% titanium dioxide content.

The mixture was agitated for 20 minutes, then spray dried resulting in a free flowing powder suitable for use as a coffee whitener. Without the anti-caking, anti-sticking additive the product would not be a free flowing powder.

EXAMPLE 6

Fresh acid whey at 6.3% solids was neutralized to pH 6.8 using 4 normal lime solution, then concentrated to 48% solids using low preheat during evaporation.

To the concentrate was added an anti-caking and anti-sticking additive containing 20% titanium dioxide, 40% soybean oil and 40% water, which additive was prepared by recirculation through a colloidal mill for 3 minutes residence time at a temperature of 175° F. The additive was added in the ratio of 49.4 pounds per 1000 pounds of concentrate, and to the mixture was added 480 pounds of soy flakes containing 45% protein and .5% fat.

The mixture was agitated for 30 minutes, then spray dried in a nozzle-type dryer using No. 62 nozzles and No. 17 cores, and a spraying pressure of 4200 PSI.

The resulting product was a free flowing powder having 1% titanium dioxide, 2.2% fat and 28% protein; and was suitable for use as a calf milk replacer.

In all of the examples given above, an additive consisting of a premixture of titanium dioxide, fat and water mixed at temperatures between 165° and 180° F. was added to the whey, whether acid, sweet or a combination of the same, and a final free flowing non-caking powder was obtained, which resultant product had a titanium dioxide level of between 0.5% and 1.8% and a fat level of between 2.2% to 40%. The temperature range of the additive mix could be expanded to slightly higher and lower degrees but preferably, as set forth hereinabove, mixing of the additive should take place at temperatures from 130° to 200° F. By weight in the examples given above, the percentage of titanium dioxide to the total additive varies from 10 to 20%, the fat from 20 to 40%, and water from 40 to 60%.

What is claimed is:

1. A process for making a free flowing modified whey powder comprising:
   (a) mixing titanium dioxide, fat and water and forming an emulsion thereof by processing at a temperature range of 32° F to 200° F for a time period between 16 seconds and 3 hours;
   (b) adding said mixture to concentrated whey and
   (c) spray drying the same;
   and wherein the level of titanium dioxide in the final dried product falls within 0.5 and 20% and the fat level falls between 0.5 and 70%.

2. The process of claim 1 wherein said whey is selected from a group consisting of acid whey from the production of soft cheeses; or acid whey from the production of casein; or sweet whey from the production of hard cheese, or whey from the churning of butter.

3. The process of claim 1 wherein the titanium dioxide is of anatase or rutile form.

4. The process of claim 1 wherein the fat is selected from a group consisting of animal, marine and vegetable triglycerides, and hydrogenated products of such triglycerides.

5. The process of claim 1 wherein after the mixture of titanium dioxide, fat and water is emulsified and added to the whey, the emulsified mixture and whey are agitated prior to spray drying.

6. The process of claim 1 wherein said whey is concentrated to 20–70% solids before introduction of said "a" mix.

7. The process of claim 1 wherein said whey is neutralized to pH 5.6 to 8.0 before introduction of said "a" mix.

8. The process of claim 1 wherein said whey is neutralized and concentrated before introduction of said "a" mix.

9. The process of claim 1 wherein said "a" mix is introduced during the concentration of said whey.

10. The process of claim 1 wherein said whey is concentrated and crystallized before introduction of said "a" mix.

11. The process of claim 1 wherein said "a" mix contains an emulsification agent selected from a group consisting of mono and diglycerides of fat forming fatty acids, mono and diolein, partial esters of carboxylic acids from a group consisting of citric, lactic and tartaric acids with the mono and diglycerides of fatty acids; and diesters of glycols and fatty acids; the fatty acids used to prepare the above emulsifiers are selected from a group consisting of those derived from beef tallow and castor, coconut, hydrogenated coconut, cottonseed, mustard seed, palm, peanut, rapeseed, rice bran, soybean, tall and marine oils.

12. The process of claim 1 wherein said "a" mix contains sufficient lime to neutralize the whey from pH 5.6 to a range of pH 6.2 to 7.4.

13. The process of claim 1 wherein the "a" mix contains 20% titanium dioxide, 40% fat and 40% water.

14. The process of claim 1 wherein the "a" contains 10% titanium dioxide, 50% fat and 40% water.

15. The process of claim 1 wherein the "a" mix contains 20% titanium dioxide, 23% fat and 57% water.

16. The process of claim 1 wherein additional proteinaceous materials are added to the whey along with the "a" mix.

17. The process of claim 1 wherein said "a" mix contains a stabilizing agent selected from the group consisting of proteins, pectins and naturally occuring plant polysaccharide gums.

18. The process of claim 1 wherein said "a" mix contains an emulsification agent selected from a group consisting of mono and diglycerides of fat forming fatty acids, partial esters of carboxylic acids from a group consisting of citric, lactic and tartaric acids with the mono and diglycerides of fatty acids, and diesters of glycols and fatty acids; the fatty acids used to prepare the above emulsifiers selected from the group consisting of those derived from beef tallow and castor, coconut, hydrogenated coconut, cottonseed, mustard seed, palm, peanut, rapeseed, rice bran, soybean, tall and marine oils, and a stabilizing agent selected from the group consisting of proteins, pectins and naturally occuring plant polysaccharide gums.

19. A free flowing modified whey powder consisting of
 (a) whey solids coated with;
 (b) an anti-caking and non-sticking additive consisting of an admixture of titanium dioxide, fat and water;
 the level of titanium dioxide in the final product lying between 0.05% and 20% and the fat level lies between 0.5% and 70%.

20. The powder of claim 19 wherein the additive is U.S. pure titanium dioxide in the anatase form.

21. The powder of claim 20 wherein the fat is whey fat.

22. The powder of claim 20 wherein the fat is animal fat.

23. The powder of claim 20 wherein the fat is vegetable fat.

24. The powder of claim 20 wherein the titanium dioxide comprises 0.5% to 1% of the product and the fat comprises 2.5%.

25. The powder of claim 20 wherein the titanium dioxide comprises 2% of the product and the fat comprises 2.5%.

26. The powder of claim 20 wherein the titanium dioxide comprises 1.8% of the product and the fat comprises 4%.

* * * * *